US008508087B2

(12) United States Patent
Park et al.

(10) Patent No.: US 8,508,087 B2
(45) Date of Patent: Aug. 13, 2013

(54) MOUNTING DEVICE FOR DISK IN SPINDLE MOTOR

(75) Inventors: Jae Hyun Park, Jinhae-si (KR); Jin Seung Yoo, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 47 days.

(21) Appl. No.: 13/335,650

(22) Filed: Dec. 22, 2011

(65) Prior Publication Data

US 2012/0091831 A1    Apr. 19, 2012

Related U.S. Application Data

(63) Continuation of application No. 13/293,862, filed on Nov. 10, 2011, now Pat. No. 8,307,385, which is a continuation of application No. 12/842,837, filed on Jul. 23, 2010, now Pat. No. 8,082,562, which is a continuation of application No. 11/642,630, filed on Dec. 21, 2006, now Pat. No. 7,979,874.

(30) Foreign Application Priority Data

Dec. 21, 2005  (KR) .................. 10-2005-0126777

(51) Int. Cl.
*H02K 7/00*    (2006.01)
(52) U.S. Cl.
USPC .......................................... 310/67 R; 310/90
(58) Field of Classification Search
USPC ............... 310/67 R, 90; 360/98.08; 720/707
See application file for complete search history.

(56) References Cited

U.S. PATENT DOCUMENTS

| 4,409,629 A | 10/1983 | Puls |
| 4,413,294 A | 11/1983 | Beijer |
| 4,420,830 A | 12/1983 | Green |
| 4,484,321 A | 11/1984 | Eisemann |
| 4,637,010 A | 1/1987 | Okita |
| 4,705,279 A | 11/1987 | Mizukami et al. |
| 4,737,948 A | 4/1988 | Okita |
| 4,786,997 A * | 11/1988 | Funabashi et al. ............ 720/705 |
| 5,056,082 A | 10/1991 | Ekhoff |
| 5,583,717 A | 12/1996 | Nakata et al. |
| 5,586,104 A | 12/1996 | Choi |
| 5,610,900 A | 3/1997 | Yamashita et al. |
| 5,731,929 A | 3/1998 | Chaya |
| 6,205,111 B1 * | 3/2001 | Hayakawa .................... 720/707 |
| 6,757,238 B2 | 6/2004 | Higuchi |

(Continued)

FOREIGN PATENT DOCUMENTS

| JP | 1990-110050 U | 9/1991 |
| JP | 08-329517 A | 12/1996 |

(Continued)

*Primary Examiner* — Thanh Lam
(74) *Attorney, Agent, or Firm* — Birch, Stewart, Kolasch & Birch, LLP

(57) ABSTRACT

A spindle motor including a base, a bearing housing supported on the base, a bearing provided within the bearing housing, a rotating shaft rotatably supported by the bearing, a stator including a core fixed to the bearing housing and coils wound around the core, a rotor including a rotor yoke fixed to the rotating shaft, and a first magnet installed on the rotor yoke facing the stator, a turntable positioned on the rotor yoke, rotating together with the rotating shaft, a center guide member coupled to the rotating shaft at an upper side of the turntable, an elastic member disposed between the turntable and the center guide member for elastically supporting the center guide member.

20 Claims, 2 Drawing Sheets

(56) References Cited

U.S. PATENT DOCUMENTS

| | | |
|---|---|---|
| 7,979,874 B2 | 7/2011 | Park et al. |
| 8,024,751 B2 * | 9/2011 | Yoon .............................. 720/712 |
| 8,074,240 B2 * | 12/2011 | Yamaguchi ................... 720/707 |
| 8,082,562 B2 | 12/2011 | Park et al. |
| 8,352,976 B2 * | 1/2013 | Smirnov et al. ............... 720/707 |
| 2001/0038250 A1 * | 11/2001 | Katagiri et al. ............. 310/67 R |
| 2004/0139456 A1 | 7/2004 | Lin et al. |
| 2004/0232781 A1 | 11/2004 | Yoo |
| 2005/0060733 A1 | 3/2005 | Osada |
| 2005/0240954 A1 | 10/2005 | Santo et al. |
| 2007/0028255 A1 * | 2/2007 | Ito et al. ........................ 720/706 |
| 2007/0067790 A1 | 3/2007 | van der Sanden |
| 2008/0059984 A1 * | 3/2008 | Kanzawa et al. ............. 720/707 |

FOREIGN PATENT DOCUMENTS

| | | |
|---|---|---|
| JP | 10-340528 A | 12/1998 |
| JP | 2000-298931 A | 10/2000 |
| JP | 2002-333053 A | 11/2002 |
| JP | 2003-178504 A | 6/2003 |
| KR | 10-1997-0012493 A | 3/1997 |
| KR | 20-1998-058703 U | 10/1998 |
| KR | 10-2001-0097243 A | 11/2001 |

* cited by examiner

MOUNTING DEVICE FOR DISK IN SPINDLE MOTOR

This application is a continuation of application Ser. No. 13/293,862, filed on Nov. 10, 2011 now U.S. Pat. No. 8,307,385, which is a continuation of application Ser. No. 12/842,837, filed on Jul. 23, 2010, now U.S. Pat. No. 8,082,562, issued on Dec. 20, 2011, which is a continuation of application Ser. No. 11/642,630, filed on Dec. 21, 2006, now U.S. Pat. No. 7,979,874, issued Jul. 12, 2011 the entire contents of which are hereby incorporated by reference and for which priority is claimed under 35 U.S.C. §120.

BACKGROUND OF THE INVENTION

1. Field of the Invention

The present invention relates to a spindle motor, and more particularly, to a mounting device for a disk in a spindle motor.

2. Description of the Related Art

Spindle motors are generally motors installed in optical pick-up devices. A spindle motor rotates a disk so as to read data recorded on the disk or record data on the disk.

A spindle motor includes a drive unit for spinning a disk and a mounting unit for stably mounting the disk. The present invention relates to a mounting device for stably mounting a disk.

In the spindle motor, the drive unit includes a rotor and a stator. The rotor is rotated by an interaction between an electric field generated by an external power applied to the stator, and a magnetic field generated from a magnet installed in the rotor. The mounting device includes a first bushing respectively fixed on the stator and rotor from above the stator, a turntable fixed on the outer surface of the first bushing, a center guide member connected to the turntable with a spring in between, and a second bushing provided above the center guide member. The spring supports the center guide member from below in vertical and horizontal directions, and the center of the disk mounted on the turntable is aligned with the rotating axis of the spindle motor for rotating the disk.

Here, spindle motors according to the related art are manufactured with center guide members using expensive red brass. Also, the first and second bushings connected to the center guide member are also manufactured with red brass. Therefore, the material costs for manufacturing the spindle motor are unfavorable.

Additionally, the second bushing and the center guide member are manufactured separately and coupled together, and a protruding surface in a stepped shape is formed above and below the boundary of the second bushing and the center guide member. Accordingly, while the disk is inserted on the second bushing and slid downward in order to load the disk on the turntable the disk may not be smoothly slide over the boundary surface between the second bushing and the center guide member.

Also, when a disk, made of a resin material, is inserted on the second bushing and center guide member that are both made of brass, the disk may be damaged and permanently deformed by the metal.

SUMMARY OF THE INVENTION

Accordingly, the present invention is directed to a spindle motor and a mounting device for a disk in a spindle motor that substantially obviates one or more problems due to limitations and disadvantages of the related art.

An object of the present invention is to provide a spindle motor with a reduced number of components and which uses alternative materials to reduce the cost of manufacturing.

Another object of the present invention is to provide a spindle motor that allows a disk to slide evenly and be mounted on a turntable.

A further object of the present invention is to provide a spindle motor that does not induce deformation of a disk and facilitates the mounting of a disk.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a spindle motor including: a base; a bearing housing supported on the base; a bearing provided within the bearing housing; a rotating shaft rotatably supported by the bearing; a stator fixed to the bearing housing and wound by at least one coil; a rotor including a rotor yoke fixed to the rotating shaft, and a magnet installed on the rotor yoke facing the stator; a turntable positioned on the rotor yoke, rotating together with the rotating shaft, and mounting a disk on an upper surface thereof; a center guide member formed of a plastic material, into which the rotating shaft is inserted at an upper side of the turntable to be capable of rising and descending thereon, the center guide member for supporting the disk; an elastic member for elastically supporting the center guide member; and a back yoke fixed on the rotating shaft at an upper side of the center guide member, for preventing a disengaging of the center guide member from the rotating shaft.

In another object of the present invention, there is provided a spindle motor including: a drive unit providing rotating force for rotating a disk; and a mounting unit for securely mounting the disk, wherein the mounting unit includes: a turntable rotating together with a rotating shaft, for mounting the disk thereon; a center guide member into which the rotating shaft is inserted, at an upper side of the turntable, for supporting the disk; and an elastic member interposed between the turntable and the center guide member, for elastically supporting the center guide member from below, wherein the turntable directly contacts and is fixed to the rotating shaft.

In a further object of the present invention, there is provided a supporting structure for a disk in a spindle motor, including: a turntable upon which the disk is mounted; a center guide member formed of a resin material, into which a rotating shaft is inserted at an upper side of the turntable; an elastic member interposed between the turntable and the center guide member, for elastically supporting the center guide member; and a back yoke for preventing a disengaging of the center guide member.

In a still further object of the present invention, there is provided a supporting structure for a disk in a spindle motor including: a turntable upon which the disk is mounted; a center guide member formed as one body, into which a rotating shaft is inserted, at a upper side of the turntable; and an elastic member interposed between the turntable and the center guide member, for elastically supporting the center guide member, wherein an outer portion of the center guide member is formed to progressively widen in diameter in a downward direction.

The present invention provides a spindle motor with a reduced number of components to reduce its manufacturing cost, that allows a disk to evenly slide and be mounted on a turntable, that does not induce deforming of a disk during its mounting, and that facilitates the mounting of a disk thereon.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
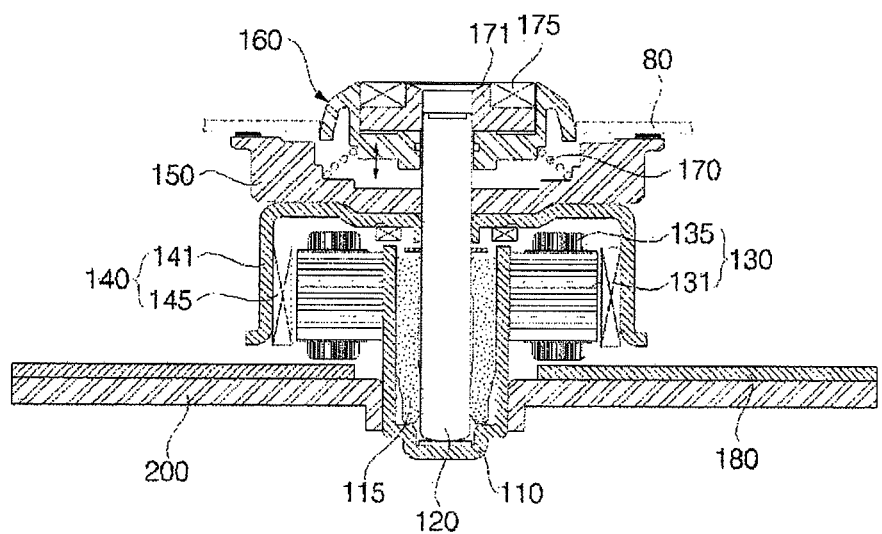
FIG. 1 is a sectional view of a spindle motor according to an embodiment of the present invention.

FIG. 1 is a sectional view of a spindle motor according to an embodiment of the present invention.

Referring to FIG. 1, the spindle motor 100 according to one embodiment of the present includes a base 200, a bearing housing 110 rising and installed on the base 200, a bearing 115 installed within the bearing housing 110, and a rotating shaft 120 that is rotatably installed with its lower end supported by the bearing 115.

The stator 130 is fixed to the outer surface of the bearing housing 110. The stator 130 includes a core 131 fixed to the outer surface of the bearing housing 110, and coils 135 wound around the core 131.

Also, a rotor 140 is coupled at the proximal center of the rotating shaft 120 exposed at its top. The rotor 140 is provided in a cylindrical shape open at the bottom, and includes a rotor yoke 141 coupled to the outer surface of the rotating shaft 120, and a magnet 145 coupled to the inner surface of the rotor yoke 141 and facing the stator 130. Accordingly, when a current is supplied to the coils 135, electromagnetic force generated between the stator 130 and the rotor 140 rotates the rotor 140, thereby rotating the rotating shaft 120.

The turntable 150 is fixed to the outer surface of the rotating shaft 120 at the top of the rotor yoke 141, and a disk 80 is mounted on the top surface of the turntable 150. Because the turntable 150 is coupled directly to the rotating shaft 120, the thickness of the inner surface of the turntable 150 contacting the rotating shaft 120 is formed in a thickness allowing for a sufficiently strong coupling with the rotating shaft 120. In the spindle motor 100 according to this embodiment, the inner surface of the turntable 150 contacting the rotating shaft 120 is formed in an elongated tube shape to increase the contacting surface with the rotating shaft 120. Selectively, the rotor yoke 141 and the turntable 150 may be fixed together to reinforce the structure.

A center guide member 160, on which the disk 80 is inserted is installed to be capable of rising and descending on the portion of the rotating shaft 120 that protrudes upward from the turntable 150. For this end, an elastic member 170, such as a spring for elastically supporting the center guide member 160 in a radial direction to the rotating shaft 120, is provided between the turntable 150 and the center guide member 160. Therefore, the disk 80 that is inserted and supported on the center guide member 160 can be mounted on the turntable 150 in a radial direction to the rotating shaft 120.

The center guide member 160 is injection molded of a plastic material, and includes a coupling plate 161, a dividing wall 163, and a supporting band 165.

Figure 2:
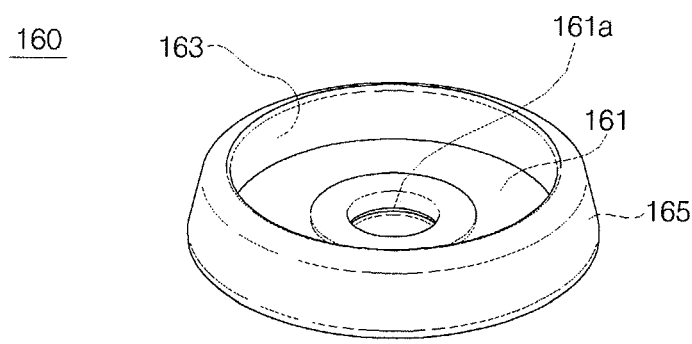
FIGS. 2 through 4 are respectively a top perspective view, a bottom perspective view, and a sectional view of the center guide member shown in FIG. 1.
Figure 3:
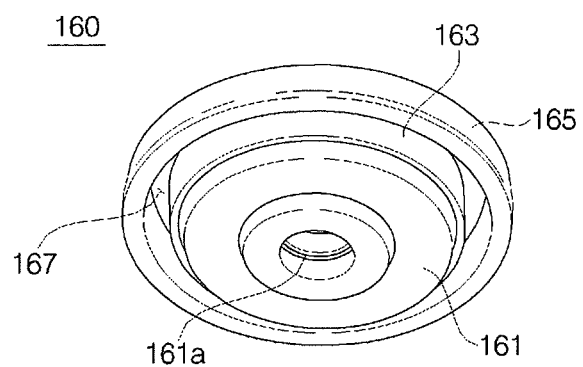
Figure 4:
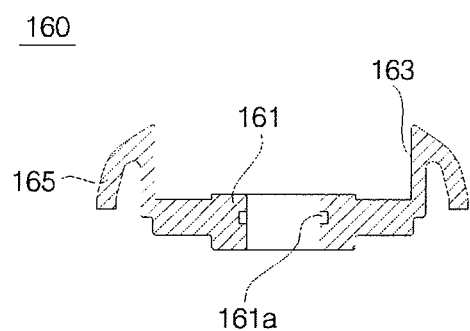

FIGS. 2 through 4 are respectively a top perspective view, a bottom perspective view, and a sectional view of the center guide member shown in FIG. 1. With reference to FIGS. 2 through 4, the structure of the mounting portion of the spindle motor—especially the center guide member—will be described in further detail.

Referring to FIGS. 2 through 4, the coupling plate 161 is provided in a disk shape and has an inner surface that is inserted around the outer surface of the rotating shaft 120. The dividing wall 163 extends annularly upward from a peripheral portion of the coupling plate 161. The supporting band 165 is formed extending downward from an upper end of the dividing wall 163. A space 167 is provided between the supporting band 165 and the dividing wall 163, as shown in FIG. 3. The disk 80 is inserted and supported thereon.

Here, the supporting band 165 is formed with a gradual slope to be radially more distant from the rotating shaft 120 as it goes from an upper side to a lower side. This is to allow the disk 80 to slide along the tapered supporting band 165 and be supported at a lower portion thereof. Also, in order for the disk 80 to evenly slide downward along the outer surface of the supporting band 165, the outer surface of the supporting band 165 may be configured to be smoothly and gradually tapered. This shape may be achieved easily by injection molding the center guide member.

The center guide member 160 is injection molded, and depending on the injection molding conditions thereof, the inner surface of the coupling plate 161 may deform. To prevent this deformation, ring-shaped groove 161a is formed in the inner surface of the coupling plate 161. Especially in a case where the central portion of the coupling plate 161 coupled to the rotating shaft 120 is formed thicker than the outer portion of the coupling plate 161, the need for the groove 161a increases. The central portion of the coupling plate 161 is made thicker to securely support the coupling plate 161 about the rotating shaft 120.

Furthermore, the groove 161a aids in enabling the center guide member 160 to move smoothly about the rotating shaft 120 by minimizing the contacting surface therewith. The groove 161a may maintain a uniform clearance between the coupling plate 161 and the rotating shaft 120, so that movement of the center guide member 160 in a radial direction is minimized. Also, the groove 161a may contain a lubricant for reducing or dispersing friction between the coupling plate 161 and the rotating shaft 120.

Referring again to FIG. 1, a back yoke 171 is fixed to the outer surface of the upper portion of the rotating shaft 120. The outer surface of the back yoke 171 contacts the inner surface of the dividing wall 163 of the center guide member 160. Accordingly, it is prevented that the center guide member 160 moves with respect to the rotating shaft 120. Especially, movement in a radial direction of the rotating shaft 120 and disengagement from the rotating shaft 120 are reliably prevented. Here, the back yoke 171 may move in a vertical direction with respect to the rotating shaft 120, but may be provided with a catching structure (not shown) for preventing disengagement from the rotating shaft 120.

A magnet 175 may be installed on the back yoke 171. The back yoke 171 and the magnet 175 may be fixed each other by a clamp (not shown) descended and aligned with the upper portion of the rotating shaft 120 so that the magnet is coplanar with top of the center guide member 160. The clamp presses and clamps the disk 80 mounted on the top surface of the turntable 150, and may be fixed while rotating.

Reference number 180 in FIG. 1 is a printed circuit board (PCB).

As described above, the spindle motor according to the present invention has a center guide member that is injection molded and thus has a lower material cost compared to the red brass used in the related art.

Also, the center guide member and the turntable are directly coupled to the rotating shaft, obviating the need for separate components for coupling the center guide member and the turntable to the rotating shaft. Thus, the number of components and manufacturing processes are reduced, lowering product cost.

Additionally, the disk can easily slide and mount on the turntable by virtue of the gradual sloping of the center guide member.

Furthermore, the outer surface of the back yoke fixed to the rotating shaft contacts the inner surface of the dividing wall of the center guide member, preventing oscillating of the center guide member with respect to the rotating shaft, especially in a radial direction to the rotating shaft. Accordingly, the center of the center guide member is always aligned with the center of the rotating shaft, regardless of the installed direction of the spindle motor. Thus, the spindle motor installed in the optical pick-up device according to the present invention allows the optical pick-up device to accurately read data from a disk and accurately record data on a disk.

The present invention may provide other embodiments in accordance with the scope of the present invention. For example, when the center guide member can be securely supported on the rotating shaft through the back yoke, there is no need to make the central portion of the center guide member thicker than the remaining portions thereof, in which case, there is no need for the groove.

Further, the present invention focuses mainly on the portion of the spindle motor on which the disk is mounted. Therefore, the specifications of the motor portion consisting of the stator and rotor may change according to the configuration of the spindle motor.

Also, the center guide member has its dividing wall extending upwards, and the supporting band extending downward from around the outside of the dividing wall. However, the configuration is not limited thereto, and the dividing wall may extend downward, and the supporting band may extend upward. In another embodiment, the center guide member is formed of a plastic material for the sake of manufacturing versatility; however, in an alternate embodiment, a plurality of legs that extend downward may be provided. Of course, because the center guide member is formed of plastic, damage to the disk is prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A spindle motor comprising:
a base;
a bearing housing supported on the base;
a bearing provided within the bearing housing;
a rotating shaft rotatably supported by the bearing;
a stator including a core fixed to the bearing housing and coils wound around the core;
a rotor including a rotor yoke fixed to the rotating shaft, and a first magnet installed on the rotor yoke facing the stator;
a turntable positioned on the rotor yoke, rotating together with the rotating shaft; and
a center guide member coupled to the rotating shaft at an upper side of the turntable,
wherein the center guide member comprises: a plate into which the rotating shaft is inserted, to be capable of rising and descending; a wall formed to extend upward from an outer circumference of the plate; and a band formed to extend downward from the wall,
wherein a first portion of the plate adjacent to the rotating shaft is thicker than a second portion of the plate adjacent to the wall,
wherein the turntable includes
a first upper surface adjacent to the rotating shaft;
a first wall directly connected to the first upper surface and perpendicular to the first upper surface;
a second upper surface directly connected to the first wall and perpendicular to the first wall; and
a second wall directly connected to the second upper surface and extended upward.

2. The spindle motor according to claim 1, wherein the rotor yoke includes a first portion coupled to the rotating shaft, a second portion connected to an upper portion of the first portion and extended outward in a radial direction, and a third portion connected to the second portion and extended downward in a vertical direction, and
wherein the first magnet is disposed on an inner side surface of the third portion.

3. The spindle motor according to claim 1, wherein the center guide member is formed of a plastic material.

4. The spindle motor according to claim 1, wherein the center guide member includes a groove formed around an inner circumference of the first portion of the plate.

5. The spindle motor according to claim 1, further comprising: a back yoke fixed on the rotating shaft at an upper side of the center guide member, for preventing a disengaging of the center guide member from the rotating shaft.

6. The spindle motor according to claim 5, wherein the back yoke includes a first portion in direct contact with the rotating shaft and a second portion connected to the first portion of the back yoke and extended outward in the radial direction.

7. The spindle motor according to claim 6, wherein the first portion of the back yoke is thicker than the second portion of the back yoke in the vertical direction.

8. The spindle motor according to claim 5, wherein a top surface of the back yoke is higher than a top surface of the rotating shaft.

9. The spindle motor according to claim 5, further comprising:
a second magnet directly coupled to the back yoke.

10. The spindle motor according to claim 9, wherein an inner circumferential surface and a lower surface of the second magnet is in contact with the back yoke.

11. The spindle motor according to claim 10, wherein an outer circumferential surface of the second magnet is in contact with the center guide member.

12. The spindle motor according to claim 9, wherein a top surface of the second magnet and a top surface of the center guide member are disposed on same horizontal plane.

13. The spindle motor according to claim 1, wherein a lower surface of the turntable is in contact with an upper surface of the second portion of the rotor yoke.

14. The spindle motor according to claim 2, wherein an upper surface of the second portion of the rotor yoke includes a first surface and a second surface, wherein the first surface is higher than the second surface.

15. The spindle motor according to claim 5, wherein a lower surface of the back yoke is partially contacted with an upper surface of the center guide member.

16. The spindle motor according to claim 9, wherein a lower surface of the second magnet is partially contacted with an upper surface of the back yoke.

17. The spindle motor according to claim 1, wherein the rotor yoke and the turntable are fixed together.

18. A spindle motor comprising:
a base;
a bearing housing supported on the base;
a bearing provided within the bearing housing;
a rotating shaft rotatably supported by the bearing;
a stator including a core fixed to the bearing housing and coils wound around the core;
a rotor including a rotor yoke fixed to the rotating shaft, and a first magnet installed on the rotor yoke facing the stator;
a turntable positioned on the rotor yoke, rotating together with the rotating shaft;
a center guide member directly coupled to the rotating shaft at an upper side of the turntable;
a back yoke fixed on the rotating shaft at an upper side of the center guide member, for preventing a disengaging of the center guide member from the rotating shaft; and
a second magnet coupled to the back yoke,
wherein a lower surface of the second magnet is partially contacted with an upper surface of the back yoke,
wherein an upper surface of the back yoke includes a recess, wherein the recess faces a lower surface of the second magnet,
wherein the center guide member includes:
a plate into which the rotating shaft is inserted, to be capable of rising and descending;
a wall formed to extend upward from an outer circumference of the plate to form a first recess to receive the back yoke; and
a band formed to extend downward from the wall and progressively extended farther from a center of the rotating shaft in a downward direction,
wherein the plate includes a second recess on an upper surface thereof,
wherein the inner diameter of the second recess is spaced from the rotating shaft.

19. The spindle motor according to claim 18, wherein a first portion of the plate adjacent to the rotating shaft is thicker than a second portion of the plate adjacent to the wall.

20. A spindle motor comprising:
a base;
a bearing housing supported on the base;
a bearing provided within the bearing housing;
a rotating shaft rotatably supported by the bearing;
a stator including a core fixed to the bearing housing and coils wound around the core;
a rotor including a rotor yoke fixed to the rotating shaft, and a first magnet installed on the rotor yoke facing the stator;
a turntable positioned on the rotor yoke, rotating together with the rotating shaft; and
a center guide member coupled to the rotating shaft at an upper side of the turntable,
wherein the center guide member comprises:
a plate into which the rotating shaft is inserted, to be capable of rising and descending;
a wall formed to extend upward from an outer circumference of the plate; and
a band formed to extend downward from the wall,
wherein a first portion of the plate adjacent to the rotating shaft is thicker than a second portion of the plate adjacent to the wall,
wherein an outer circumference surface of the first portion of the plate is closer to the rotating shaft than an outer circumference surface of a contact portion of the bearing housing,
wherein the contact portion of the bearing housing is directly in contact with the core,
wherein the turntable includes:
an inner circumferential surface;
an outer circumferential surface; and
a disk supporting portion disposed at an upper portion of the outer circumferential surface and protruded outward in the radial direction,
wherein the rotor yoke includes:
a first portion coupled to the rotating shaft;
a second portion connected to an upper portion of the first portion and extended outward in a radial direction; and
a third portion connected to the second portion and extended downward in a vertical direction,
wherein a vertical distance between a bottom surface of the first portion and a top surface of the second portion is greater than a vertical length of the inner circumference surface of the turntable.

* * * * *